July 9, 1940.  C. Q. PAYNE  2,206,973

METHOD OF AND APPARATUS FOR REDUCING ENRICHED IRON ORES

Filed Oct. 7, 1939   2 Sheets-Sheet 1

INVENTOR
CLARENCE Q. PAYNE
BY
ATTORNEYS

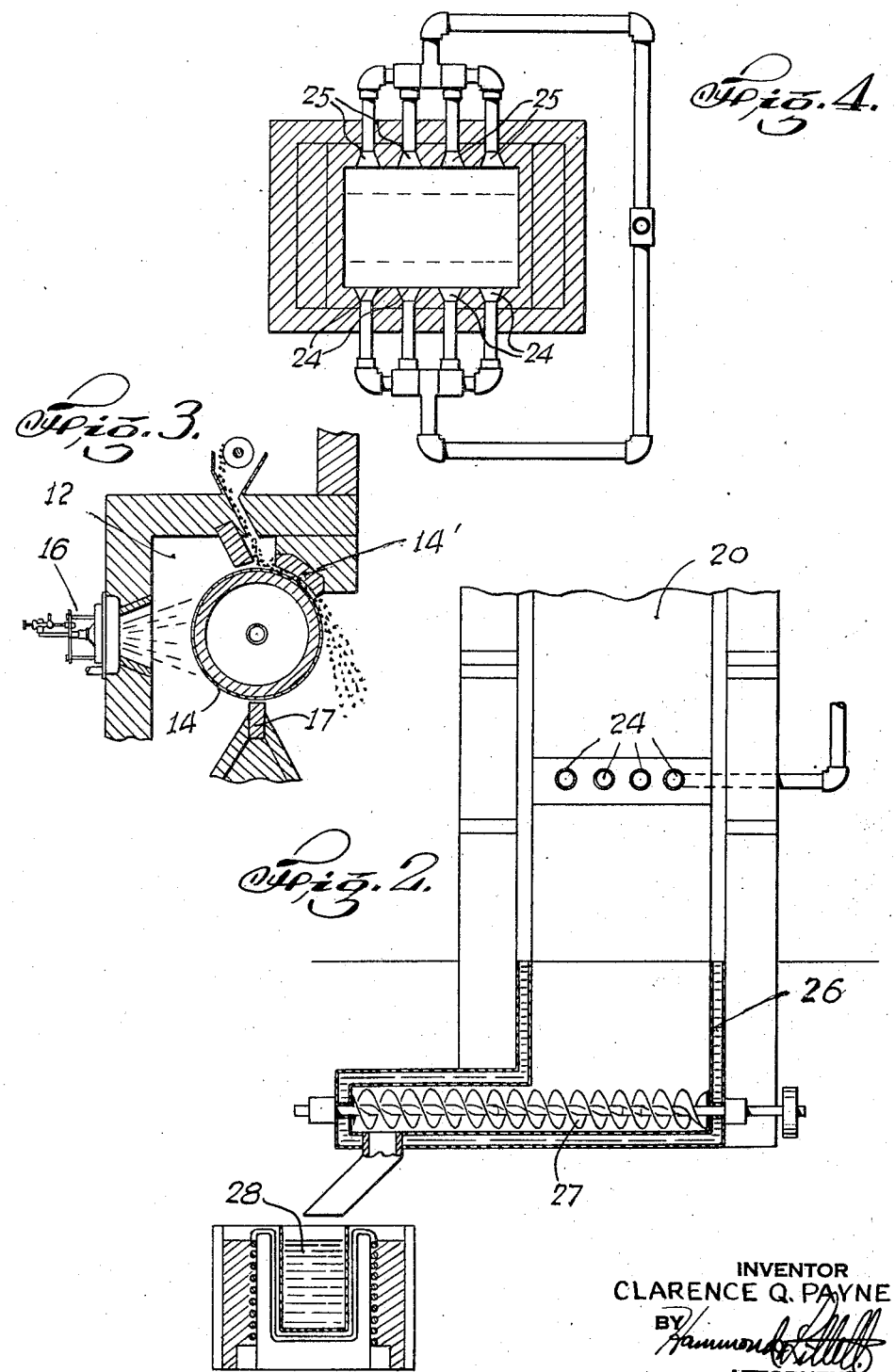

Patented July 9, 1940

2,206,973

UNITED STATES PATENT OFFICE 2,206,973

METHOD OF AND APPARATUS FOR REDUCING ENRICHED IRON ORES

Clarence Q. Payne, Shippan Point, Stamford, Conn.

Application October 7, 1939, Serial No. 298,352

3 Claims. (Cl. 75—26)

This invention relates to a novel method of and apparatus for reducing iron from all of its ores which can be enriched by the practically complete removal of their gangue minerals. It comprises charging the concentrates into a reducing furnace, where they are preheated by contact with a moving hearth heated to a temperature of about 900° C. without access to air, and without the addition of solid carboniferous material or of fluxes. It also includes preheating vaporized fuel gas to about the same temperature and then mixing the fuel gases in their ascent against the descending concentrates, without air access and finally completing the reduction of the iron by retarding its descent in the lower part of the furnace. The reduced metal may then be melted by electric furnace methods, by raising it to a sufficiently high temperature, or it may be cooled below the point of reoxidation and used in the form of iron powder for other purposes.

The essential features of the invention thus consist partly in the use of extremely rich iron concentrates obtained either by flotation or preferably by magnetic separation as explained in my copending application Serial No. 184,146, filed January 10, 1938, now Letters Patent No. 2,188,516 granted January 30, 1940, whereby practically all the mineral impurities usually associated with iron ores are eliminated, and partly in the separate preheating of the concentrates, and of the fuel gas by waste heat regeneration without access to air, so that the reduction to iron is completed at a low temperature and without any slagging operation to remove mineral impurities.

In the accompanying drawings:

Figure 2 shows a longitudinal section of the lower part of the furnace and illustrates that it may be used either for the production of sponge iron, or that the latter may be delivered to an adjoining electric furnace and melted to iron or steel;

Figure 1:
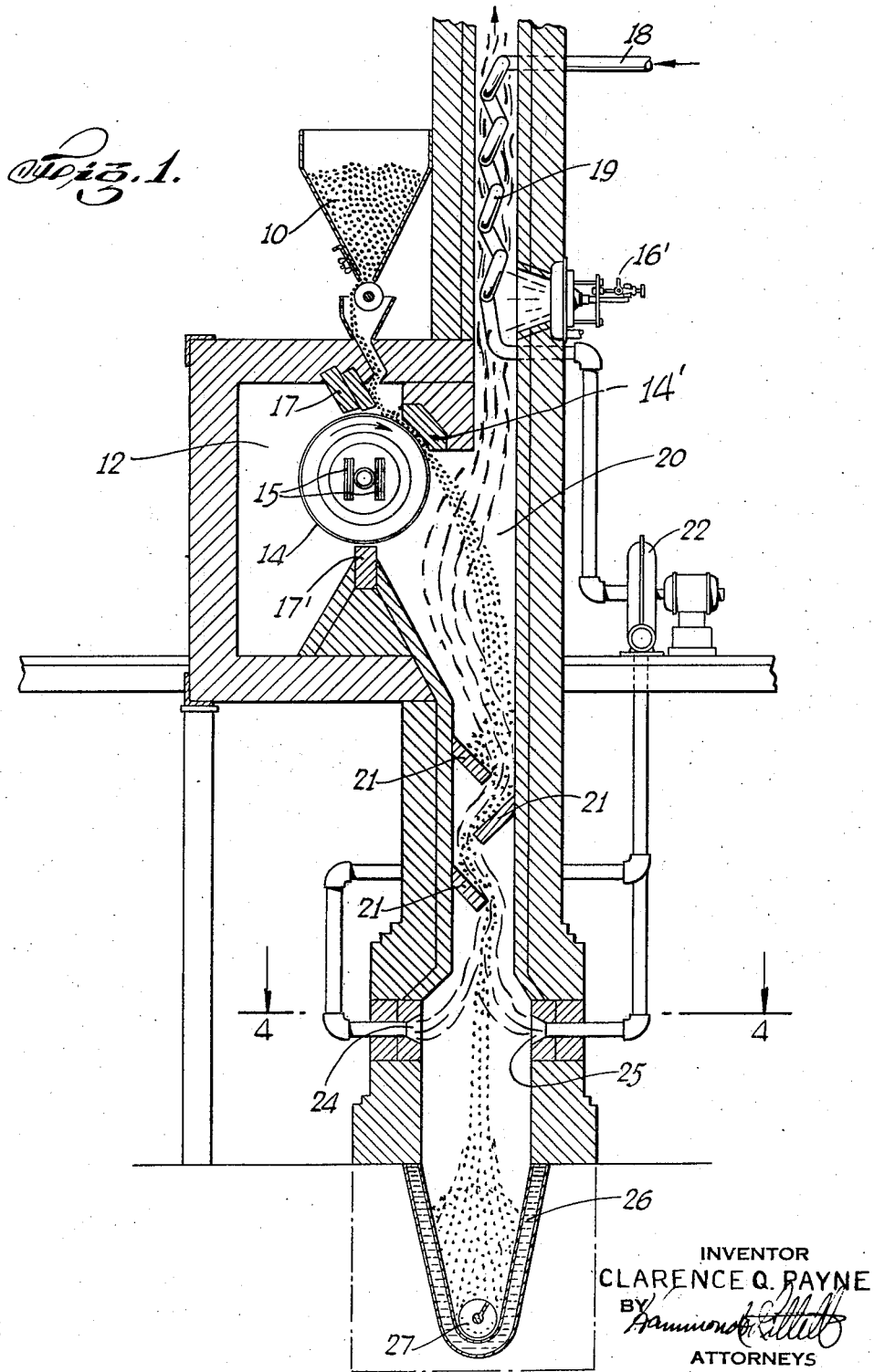
Figure 1 shows a vertical cross-section of the furnace and illustrates its operating features diagrammatically.

Figure 3 shows an alternative method of preheating the ore by means of an oil blast burner; and Figure 4 is a sectional plan view along the line 4—4 of Figure 1 to show the arrangement of the piping which introduces the fuel gas into the muffle furnace.

The ores which are amenable to this method of reduction are either strongly magnetic in their natural state, like magnetite, or else those like limonite, siderite and hematite which can be rendered magnetic by means of a reducing or magnetizing roast. In my said patent application Serial No. 184,146, filed January 10, 1938, I have described an improved method of magnetic separation whereby concentrates from strongly magnetic ores can be so enriched by magnetic separation that practically all the gangue minerals usually associated with such ores are eliminated. This is accomplished by the centrifugal force of a disc-rotor which revolves in a narrow field-gap formed between the rotor and the arcuate polepieces of an electro-magnet. By increasing the speed of the rotor so that the centrifugal force of its surface exceeds at least five times the weight of the individual particles fed upon it, opportunity is afforded to disentangle the fine-non-magnetic from the magnetic particles as they rebound repeatedly at high speed between the moving and stationary walls of the field gap, while acted on by strongly opposing forces. I have found it possible to secure in this way a magnetic concentrate which contains less than 1% of silica, or insoluble material, from a crude ore having originally about 42% of gangue minerals associated with it. So far as I know such a degree of enrichment by mechanical or magnetic separation has not heretofore been obtainable in practice.

In applying this method to the reduction of hematite, limonite and siderite iron ores it will be clear that while a magnetizing roast does not render them quite as strongly magnetic as natural magnetite, yet any difference in effect can be equalized partly by increasing the magneto-motive force of the field-charge and partly by sizing the ore after roasting it, and then separating each sized product independently. The effect of sizing permits a better adjustment of the separating forces in acting on the particles.

Sponge iron, or iron powder, is a form of the metal which is produced at a temperature much below its fusing point. At its higher temperature or melting point it then absorbs impurities or metalloids as in the blast furnace, which becomes difficult to remove. In a crude form sponge iron has been used heretofore as a precipitant for some of the more expensive metals from their solutions, such as copper and lead. A very pure form of fine iron powder, known as "ferrum reductum" has also been employed in pharmacy for many years as a cure for certain diseases. It contains about 95% of metallic iron and is about —100 mesh in size. Since its cost is unimportant and its purity essential, the oxide has usually been produced from certain iron salts from which it is then reduced to the metallic form with hydrogen. Within recent years an active demand for iron powder has developed in the electrical industry from the advantages of its use in magnet cores, loading coils, etc., which its greater magnetic permeability and lower hysteresis losses secure. With increased efficiency and economy in its production, a growing market for a pure iron powder in the electrical industry seems assured.

This new powder metallurgy has been extended to other metals besides iron especially those which are refractory in having a high melting temperature, but which can be moulded, sintered and utilized at a low temperature in powder form with marked advantage. Such are the metals tungsten, chromium, titanium, etc., and their various alloys.

Over and above these important but minor applications of powder metallurgy is the vastly greater field of direct iron ore reduction which permits iron and steel to be made without the intermediate production of cast iron. This requires not only a high efficiency of reduction but also a greater economy than is now realized by the indirect method of producing iron and steel. It is this larger field of iron ore reduction and metallurgy with which my invention is concerned.

In Figure 1 is shown a combined roasting and reducing furnace which is designed for converting the iron oxide concentrates into metallic iron in one operation. Since the invention includes the various iron ores as sources of iron oxide, the concentrates are given a preliminary calcining roast in order to drive off combined water as well as gases such as are contained in limonite, siderite and hematite ores. This makes them more porous and easily reducible by the fuel gases when preheated. Even magnetite contains a certain amount of martite as well as occluded gases and moisture, whose sudden removal by means of a contact or shattering roast, is helpful in its final reduction. The iron ores from which the concentrates are obtained must usually be crushed quite fine in order to sufficiently enrich them. This may make the concentrates as fine as 20 mesh or even finer depending upon their mineral association. They are then fed from the hopper 10 into the enclosed roasting furnace 12 in a regulated stream of ore which falls upon either a moving grate or the upper part of a revolving drum shell, such as 14. The moving grate or drum 14 may be heated in any desired manner to a temperature of 900° C. or higher, as may be required. As illustrated, an alternating current induction electro-magnet 15 is placed inside the drum shell 14 in Figure 1 to provide the necessary heat, although other methods of preheating may be used. The drum 14 may be made of stainless steel protected from oxidation by a suitable layer of a refractory ceramic on its surface. The drum shell has stationary refractory partitions which fit closely to the drum shell at its top and bottom sides as shown at 17 and 17'.

It is also possible to make the drum shell 14 of a refractory ceramic material and to heat it on one side by one or more oil blast burners 16, as shown in Figure 3. Here the heat imparted to the one side of the drum shell is absorbed by the ore-stream fed upon the other side of the drum. It is then constantly renewed or regenerated by its rotation. It thus becomes a heat interchanger and enables the heat for the ore reduction to be instantly supplied. This form of contact roaster is more fully described in my United States Patent No. 2,039,833. It is shown here in a more compact form in Figure 3, in combination with the reducing furnace.

In order to gain a reasonable capacity in treating an ore made up of finely crushed particles the drum shell 14 is revolved at a speed of about 100 to 200 revolutions per minute. At this speed the particles when fed upon its surface are thrown off by centrifugal force. By means of a curved refractory guide plate placed close to the drum surface, as shown at 14', the particles so removed are deflected and repeatedly returned to the drum surface while within the arc of the guide plate. This enables them to be preheated to their centers and raised to the temperature of 900° C. desired, before they encounter the reducing gases.

In feeding the concentrates from the hopper 10 to the roaster 14 no solid carbonaceous fuel nor flux is added to them. Reduction is preferably obtained by means of fuel gas. By avoiding the use of solid incandescent carbon for the reduction, very little absorption of carbon occurs from the low temperature gases by the reduced metal. The nature of the fuel gas will depend upon the locality where the iron ore is to be reduced. If natural gas is available this will be usually the most economical reagent for the purpose. Where a natural gas is not available then a hydrocarbon gas known as propane or butane may be employed, or hydrogen, propane or butane contain a large percentage of methane $CH_4$ and of hydrogen, both of which are active reducing agents of iron oxide. They contain little or no nitrogen. The inlet of the reducing gas 18 may be connected with the waste heat regenerator pipes 19 which are placed in the stack of the reducing furnace 20.

The vaporized and heated fuel gas is caused to circulate through the piping system shown in Figures 1 and 4 by means of blower 22 and motor which maintain the gas under a slight pressure. This piping system is preferably insulated where it is exposed to the air in order to maintain as nearly as possible the same temperature at the inlet ports 24, 25 leading into the furnace as that of the reducing gases in the furnace flue viz., about 900° C.

The reducing furnace 20 is in effect a vertical muffle-furnace heated on the inside by the preheated reagents, also by the combustion of the gases composing the vaporized fuel. The oxygen to support the combustion is derived solely from the iron oxides of the ore. The reducing furnace 20 may be constructed of fire-brick and lined with a more durable refractory like carborundum on its four sides. This is more resistant to hot gases and also to abrasion from the reduced iron as it descends through the furnace. The course of the preheated ore particles as they are discharged from the revolving roaster 14 into the reducing furnace 20 is shown in Figure 1. The path of the preheated reducing gases as they enter the furnace from the inlet pipes 24, 25 and ascend against the descending ore particles is indicated by broken lines. Since both have been preheated to the point of flash reduction the time required for the ore reduction is very short. Moreover the reaction is brought under complete control by proper adjustment of the preheating temperature to the size of the ore particles, and to the amount of the reducing gases. In order to insure complete reduction of the ore particles a series of inclined deflecting plates may be introduced in the lower part of the furnace as shown at 21 in Figure 1 in order to retard their free fall at the point just above the inlet pipes 24, 25. Here the reducing gases are most active for reduction. When the material to be reduced is fine in size an increased pressure of reducing gas may be used to retard the flow of material downward in place of deflecting plates 21.

In the reduced iron particles pass below the point of inlet of the gases at 24, 25 they enter a wider section 28 of the furnace and then fall against a water cooled trough 26 at the bottom of the furnace, where their temperature is reduced below the point of reoxidation. This completes the cycle of their reduction from iron ore to iron powder or sponge iron.

It is understood that in starting the furnace it will be necessary to provide means for temporarily heating the regenerative gas pipes 19 shown in the furnace flue 20 of Figure 1 in order to preheat the fuel gas. This may be done by the use of a blast burner similar to 16, and placed just below the pipes 19, as indicated by broken lines at 16' in Figure 1. The reduced iron can be removed from the furnace in any suitable manner as by means of a screw conveyor shown in Figures 1 and 2 at 27. It may then be utilized for the various purposes for which a pure iron powder is now available. It may also be delivered to an electric furnace for a further increase in temperature so as to obtain molten iron. While a high frequency induction furnace is shown at 28 in Figure 2, it is also possible to utilize an electric arc-gap furnace or a resistance furnace in its place. This will depend largely upon the nature of the metal which may be desired, more especially with reference to its carbon content.

Heretofore when somewhat low grade ores have been utilized the presence of gangue minerals form, with the ore, easily fused slag particles. These cause accretions to form upon the furnace walls, especially those of the revolving kiln type. The accretions gradually choke the flow of the ore through the furnace. This applies especially to those which add solid carbonaceous material to the ore charge. Incandescent carbon raises the temperature of the furnace walls much too high for low temperature iron reduction, and all temperature control is lost. By utilizing only the highest grade concentrates without gangue minerals and by close temperature control, both of the ore charge and of the reducing gases, as explained above, pure iron can be produced at a lower reduction cost and with a smaller furnace cost than has heretofore been possible.

It is understood that the apparatus shown herein is intended to illustrate my invention diagrammatically and that modifications and variations may be made to the apparatus within the scope and spirit of my invention. All such variations I intend to include within the scope of the claims appended hereinafter.

I claim:

1. The method of reducing highly enriched iron ores which consists in preheating their finely crushed concentrates to a temperature of about 900° C. by bringing them into repeated contact with a moving heated hearth, while out of contact with air, feeding the ores into a vertical muffle furnace against a rising current of reducing gases preheated to about the same temperature without access of air, then completing their reduction by retarding their free fall in the lower part of the furnace and finally cooling the reduced sponge iron to prevent its reoxidation.

2. Apparatus for enriching and reducing iron ores to metallic form, which comprises a revolving drum heated by electro-magnetic induction to a temperature of about 900° C. and with which the ore particles are brought into repeated contact, means for charging the heated particles into the ascending current of preheated reducing gases contained in a vertical muffle furnace without access of air, in combination with means for retarding their free fall in the lower part of the furnace to complete their reduction to sponge iron.

3. In apparatus for enriching and reducing iron ores to metallic form, means for first eliminating practically all the gangue minerals associated with said ores by subjecting them in a magnetic field to a centrifugal force many times the weight of the individual particles, means for preheating the concentrates so obtained to a temperature of about 900° C. by repeated contact with a moving hearth while out of contact with air; in combination with means for charging said concentrates into a vertical muffle furnace against a rising current of reducing gases preheated, without access of air, to about the same temperature as the concentrates, and means for completing their reduction to sponge iron and for cooling the sponge iron to avoid reoxidation.

CLARENCE Q. PAYNE.